(12) United States Patent
Koase

(10) Patent No.: US 9,120,932 B2
(45) Date of Patent: Sep. 1, 2015

(54) INK SET AND INK JET RECORDING METHOD USING THE INK SET

(75) Inventor: Takashi Koase, Nagano (JP)

(73) Assignee: Seiko Epson Corporation (JP)

( * ) Notice: Subject to any disclaimer, the term of this patent is extended or adjusted under 35 U.S.C. 154(b) by 137 days.

(21) Appl. No.: 13/232,037

(22) Filed: Sep. 14, 2011

(65) Prior Publication Data

US 2012/0075380 A1    Mar. 29, 2012

(30) Foreign Application Priority Data

Sep. 28, 2010 (JP) ................. 2010-217182

(51) Int. Cl.
| | |
|---|---|
| *B41J 2/01* | (2006.01) |
| *C09D 4/06* | (2006.01) |
| *B41J 2/21* | (2006.01) |
| *C09D 11/38* | (2014.01) |
| *C09D 11/40* | (2014.01) |
| *C09D 11/54* | (2014.01) |

(52) U.S. Cl.
CPC .............. *C09D 4/06* (2013.01); *B41J 2/2107* (2013.01); *C09D 11/38* (2013.01); *C09D 11/40* (2013.01); *C09D 11/54* (2013.01); *B41J 2/01* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0458; B41J 2/04563; B41J 29/393; B41J 2/04591; B41J 2/04581; B41J 11/42; B41J 29/38; B41J 3/60; B41J 11/0095; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC ......... 347/100, 95, 96, 101, 102, 103, 88, 99, 347/20, 21, 9; 106/31.6, 31.13, 31.27; 523/160, 161
See application file for complete search history.

(56) References Cited

U.S. PATENT DOCUMENTS 5,780,526 A * 7/1998 Matsui et al. .................. 522/93
6,069,187 A * 5/2000 Kusumoto et al. ............. 522/108

(Continued)

FOREIGN PATENT DOCUMENTS

| JP | 09-207424 A | 8/1997 |
|---|---|---|
| JP | 2000-313830 A | 11/2000 |

(Continued)

OTHER PUBLICATIONS

Patent Abstract of JP09-207424 A published Aug. 12, 1997.

(Continued)

*Primary Examiner* — Manish S Shah
(74) *Attorney, Agent, or Firm* — Harness, Dickey & Pierce, P.L.C.

(57) ABSTRACT

An ink set used for an ink jet recording method, in which a reactive solution and a color ink composition are adhered to a recording medium to realize recording, contains a reactive solution containing a polyvalent metal salt, and a first color ink composition at least containing a coloring material, a sparingly water-soluble 1,2-alkanediol, a surfactant and water.

7 Claims, 4 Drawing Sheets

(56) References Cited

U.S. PATENT DOCUMENTS

| | | | |
|---|---|---|---|
| 6,084,619 A | 7/2000 | Takemoto et al. | |
| 6,086,197 A * | 7/2000 | Kubota et al. | 347/96 |
| 6,439,708 B1 * | 8/2002 | Kato et al. | 347/98 |
| 7,537,652 B2 | 5/2009 | Koganehira et al. | |
| 8,110,033 B2 | 2/2012 | Mizutani et al. | |
| 2002/0193526 A1 * | 12/2002 | Adachi et al. | 525/214 |
| 2004/0155946 A1 | 8/2004 | Nagai | |
| 2004/0239738 A1 * | 12/2004 | Watanabe | 347/100 |
| 2005/0140763 A1 * | 6/2005 | Jackson | 347/100 |
| 2006/0217458 A1 * | 9/2006 | Shakhnovich | 523/160 |
| 2007/0076073 A1 * | 4/2007 | Hornby | 347/100 |
| 2007/0100023 A1 * | 5/2007 | Burns et al. | 523/160 |
| 2007/0197684 A1 | 8/2007 | Yamashita et al. | |
| 2008/0249217 A1 * | 10/2008 | Lee et al. | 524/284 |
| 2009/0176071 A1 * | 7/2009 | Koganehira et al. | 106/31.13 |
| 2009/0234067 A1 | 9/2009 | Kariya | |
| 2010/0086685 A1 * | 4/2010 | Mizutani et al. | 106/31.13 |

FOREIGN PATENT DOCUMENTS

| | | |
|---|---|---|
| JP | 2002-019263 A | 1/2002 |
| JP | 2002-121438 A | 4/2002 |
| JP | 2003-113337 A | 4/2003 |
| JP | 2003-138172 A | 5/2003 |
| JP | 2004-009406 A | 1/2004 |
| JP | 2005-263970 A | 9/2005 |
| JP | 2006-008915 A | 1/2006 |
| JP | 2006-082359 A | 3/2006 |
| JP | 2006-083277 A | 3/2006 |
| JP | 2006-089559 A | 4/2006 |
| JP | 2007-077233 A | 3/2007 |
| JP | 2007-520372 A | 7/2007 |
| JP | 2007-217472 A | 8/2007 |
| JP | 2007-223112 A | 9/2007 |
| JP | 2007-277342 A | 10/2007 |
| JP | 2007277342 A * | 10/2007 ............ B41J 2/01 |
| JP | 2008-100371 A | 5/2008 |
| JP | 2009-137053 A | 6/2009 |
| JP | 2009-220301 A | 10/2009 |
| JP | 2010-000691 A | 1/2010 |
| JP | 2010-115854 A | 5/2010 |
| WO | WO-2005-065953 A1 | 7/2005 |
| WO | WO-2010-038436 A1 | 4/2010 |

OTHER PUBLICATIONS

Patent Abstract of JP2007-277342 A published Oct. 25, 2007.

* cited by examiner

INK SET AND INK JET RECORDING METHOD USING THE INK SET

The entire disclosure of Japanese Application No.: 2010-217182 filed on Sep. 28, 2010 is expressly incorporated by reference herein.

BACKGROUND

1. Technical Field

The present invention relates to an ink set. More specifically, the present invention relates to an ink set used for an ink jet recording method in which two liquids of a reactive solution and a color ink composition are adhered to a recording medium to perform recording, and an ink jet recording method using the ink set.

2. Related Art

An ink jet recording method is a recording method in which droplets of ink composition are sprayed and adhered to a recording medium to perform printing. In the ink jet recording method, printing using an ink composed of only a single color such as black, expression of a variety of colors using an ink set composed of three colors of yellow (Y), magenta (M) and cyan (C), or an ink set composed of four colors including black as well as these colors is made. In addition, as an ink set with better color reproduction than the ink set composed of these three or four colors, an ink set containing color ink such as orange or green in addition to the respective YMCK color inks is suggested.

In addition, in the ink jet recording method, an ink jet recording method using a combination of color inks such as YMCK and a reactive solution, that is, two components (for example JP-A-9-207424) is suggested. In accordance with the ink jet recording method using two components, when a reactive solution is brought into contact with an ink on a recording medium, the reactive solution breaks down the aggregation of ink components such as pigments, the ink components aggregate to form an aggregate on the recording medium, and high-quality printed materials which have high color density, and minimized permeation and unevenness can be thus obtained. However, color properties or permeation may be insufficient in some cases depending on the type of recording medium used.

However, in the ink jet recording method, an aqueous ink is generally used for general papers, but an aqueous ink for ink jet recording which can form good images even on a low-absorbent recording medium as a recording medium is suggested. For example JP-A-2007-277342 suggests that images with superior gloss or color reproductivity can be realized on a low-absorbent recording medium such as printing paper using an ink containing a sparingly water-soluble 1,2-alkanediol such as 1,2-octanediol and a surfactant.

The present inventors discovered that images with superior color properties and improved permeation can be obtained by applying an ink set, in which an ink composition containing sparingly water-soluble 1,2-alkanediol used for low-absorbent recording media such as printing paper is combined with a reactive solution containing a specific reactant, to plain paper. The present invention has been completed, based on this discovery.

SUMMARY

Accordingly, an advantage of some aspects of the present invention is to provide an ink set for ink jet recording to obtain images with superior color properties and improved permeation on plain paper.

In addition, another advantage of some aspects of the present invention is to provide an ink jet recording method using the ink set.

According to an aspect of the present invention, there is provided an ink set used for an ink jet recording method in which a reactive solution and a color ink composition are adhered to a recording medium to realize recording, the ink set containing: a reactive solution containing a polyvalent metal salt; and a first color ink composition at least containing a coloring material, sparingly water-soluble 1,2-alkanediol, a surfactant and water.

In addition, according to another aspect of the present invention, there is provided an ink jet recording method in which an image is recorded on a recording medium using an ink set consisting of a reactive solution and first and second color ink compositions, wherein the reactive solution contains a polyvalent metal salt, the first color ink at least contains a coloring material, sparingly water-soluble 1,2-alkanediol, a surfactant and water, the second color ink at least contains a coloring material and water, wherein the recording is carried out by adhering the reactive solution and the first color ink to the recording medium, when the recording medium is plain paper, and the recording is carried out by adhering the reactive solution and the second ink to the recording medium, when the recording medium is a low-absorbent recording medium.

In accordance with the ink set of the aspect of the present invention, images with superior color properties and improved permeation can be obtained by applying an ink set using a reactive solution containing a polyvalent metal salt in combination with a first color ink composition containing at least a coloring material, a sparingly water-soluble 1,2-alkanediol, a surfactant and water, to plain paper.

In addition, in accordance with the ink jet recording method of the aspect of the present invention, images with superior color properties and improved permeation can be obtained on any one of plain paper and a low-absorbent recording medium by applying an ink set using a reactive solution containing a polyvalent metal salt in combination with a first color ink composition at least containing a coloring material, a sparingly water-soluble 1,2-alkanediol, a surfactant and water, to plain paper, and applying an ink set using a reactive solution containing a polyvalent metal salt in combination with a color ink composition which at least contains a coloring material and water and does not contain a sparingly water-soluble 1,2-alkanediol, to a low-absorbent recording medium such as printing paper.

BRIEF DESCRIPTION OF THE DRAWINGS

The invention will be described with reference to the accompanying drawings, wherein like numbers reference like elements.

DESCRIPTION OF EXEMPLARY EMBODIMENTS

Definitions

Figure 1:
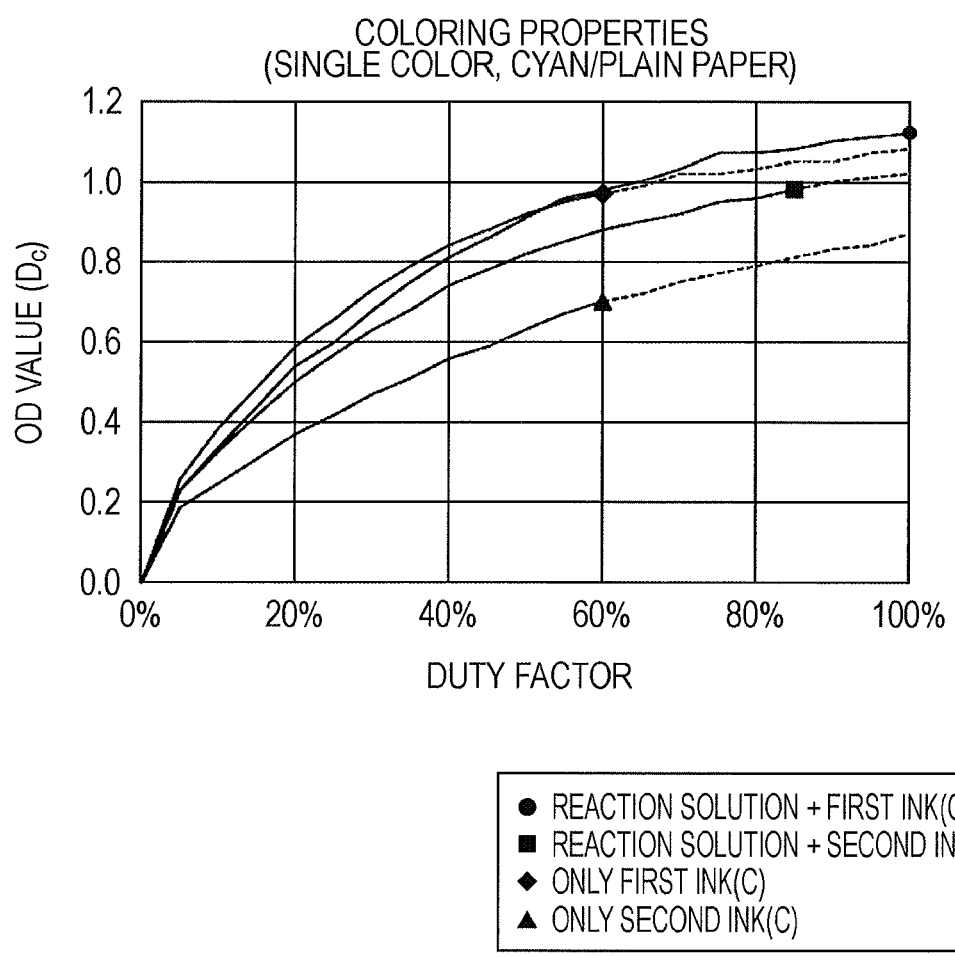
FIG. 1 is a graph showing colorimetric values ($D_c$) of cyan at respective single color duties when plain paper is used as a recording medium.

In this specification, the term "low-absorbent recording medium" refers to a recording medium whose recording surface absorbs water of 10 mL/m$^2$ or less from contact initiation to 30 msec$^{1/2}$ in accordance with the Bristow's method and means a recording medium which has no aqueous ink accepting layer or lacks an aqueous ink accepting layer.

In this specification, a hydrocarbon moiety of alkanediol, dialkylene glycol, alkanetriol and hydroxyalkoxyalkanediol may be a straight or branched chain.

In addition, the term "water-soluble" means that a solubility of a solute in water at 20° C. (amount of solute with respect to 100 g of water) is 10.0 g or more and the term "sparingly water-soluble" means that a solubility of a solute in water at 20° C. (amount of solute with respect to 100 g of water) is less than 1.0 g.

Ink Set

The ink set of the present invention consists of a reactive solution containing a polyvalent metal salt, and, a first color ink composition at least containing a coloring material, a sparingly water-soluble 1,2-alkanediol, a surfactant and water and is an ink set used for an ink jet recording method in which a reactive solution and a color ink composition are adhered to a recording medium to realize recording.

Images with superior color properties and improved permeation can be obtained even on plain paper by using an ink set consisting of a combination of a color ink composition containing a sparingly water-soluble 1,2-alkanediol and a reactive solution containing a polyvalent metal salt. Conventionally, permeation, gloss, color reproductivity or the like has been improved by applying a color ink composition containing a sparingly water-soluble 1,2-alkanediol and a surfactant to a low-absorbent recording medium such as printing paper, but improving color properties or permeation by applying such a color ink composition in combination with a reactive solution containing a polyvalent metal salt to plain paper was unexpected. The reason is considered to be as follows, although not clear. That is, by incorporating a sparingly water-soluble 1,2-alkanediol in the color ink composition, when a reactive solution containing a polyvalent metal salt comes in contact with the color ink composition on the recording medium, reactivity of the reactive solution is accelerated, and at the same time, the ink ingredient aggregates and the color ink composition thus thickens. Before the color ink composition is permeated into the recording medium, it thickens. Accordingly, the color ink composition stays on the surface of the recording medium and does not permeate into the recording medium. As a result, although a recording medium with superior ink permeability such as plain paper is used, recording density is improved, recorded materials with superior color properties are obtained, and permeation is also improved. Hereinafter, the reactive solution and color ink composition constituting the ink set of the present invention will be described.

First Color Ink Composition

The color ink composition constituting the ink set of the present invention contains a coloring material, a sparingly water-soluble 1,2-alkanediol, a surfactant and water as essential ingredients. The sparingly water-soluble 1,2-alkanediol is preferably an alkanediol having 7 or more carbon atoms, more preferably an alkanediol having 7 to 9 carbon atoms and examples thereof include 1,2-heptanediol, 1,2-octanediol, 5-methyl-1,2-hexanediol, 4-methyl-1,2-hexanediol, 4,4-dimethyl-1,2-pentanediol and the like. Of these, 1,2-octanediol is more preferred.

The color ink composition of the present invention, in addition to the sparingly water-soluble 1,2-alkanediol, further contains one or more compounds selected from the group consisting of a water-soluble 1,2-alkanediol, a dialkylene glycol, a water-soluble alkanetriol, a saccharide, and a hydroxyalkoxyalkanediol. When a color ink composition contains these ingredients, ejection stability of the color ink composition is also improved. The ejection stability increases, as the alkyl chain length of the dialkylene glycol, water-soluble alkanetriol and hydroxyalkoxyalkanediol becomes small. The small alkyl chain length for example means an alkyl chain length of 7 or less.

The water-soluble 1,2-alkanediol of the present invention is preferably an alkanediol having 6 or less carbon atoms and examples thereof include 1,2-hexanediol, 1,2-pentanediol, 1,2-butanediol, 4-methyl-1,2-pentanediol, 3,3-dimethyl-1,2-butanediol and the like. Of these, in a case where the water-soluble alkanediol is provided as a 15% aqueous solution, a water-soluble alkanediol having a surface tension of 28 mN/m or less is more preferred; 1,2-hexanediol (surface tension: 26.7 mN/m), 4-methyl-1,2-pentanediol (surface tension: 25.4 mN/m), and 3,3-dimethyl-1,2-butanediol (surface tension: 26.1 mN/m) are particularly preferred. From the viewpoint of bad smells during printing, 1,2-hexane is preferred.

In addition, the dialkylene glycol preferably is a dialkylene glycol having 2 to 4 carbon atoms and examples thereof include diethylene glycol, dipropylene glycol, dibutadiene glycol and the like. Preferred is dipropylene glycol.

In addition, examples of the water-soluble alkanetriol include 1,2,6-hexanetriol, 3-methyl-1,3,5-pentanetriol and the like.

In addition, examples of saccharides include monosaccharides, disaccharides, oligosaccharides (including trisaccharides and tetrasaccharides) and polysaccharides, or derivatives thereof. Of these, glucose, mannose, fructose, ribose, xylulose, arabinose, galactose, glucitol, sorbitol, maltose, cellobiose, lactose, sucrose, trehalose, maltotriose, furanose, raffinose and the like are preferred. Of these, raffinose is particularly preferred. When raffinose is added to the ink composition of the present invention, an intermittent recording property is improved.

In addition, polysaccharides mean an expanded range of saccharides and are construed to include substances widely present in nature such as alginic acid, α-cyclodextrin, and cellulose. In addition, examples of derivatives of these saccharides include reducing sugars of the saccharides (for example sugar alcohols (general formula: $HOCH_2(CHOH)_nCH_2OH$ (wherein n represents an integer of 2 to 5), oxidizing sugars (for example, aldonic acid, uronic acid or the like), amino acids, thio sugars and the like. Of these, sugar alcohols are particularly preferred. Specifically, examples of sugar alcohols include maltitol, sorbitol and xylitol. These saccharides may be commercially available or suitably used in combination with for example HS20, HS30, HS500 (manufactured by Hayashibara Shoji, Inc.) or Oligo GGF (manufactured by Asahi Kasei Corporation).

In addition, the hydroxyalkoxyalkanediol of the present invention is particularly not limited so long as it exerts effects of the present invention. The hydroxyalkoxyalkanediol is preferably a terminal hydroxyalkoxy-1,2-alkanediol; more preferably 3-(2-hydroxyethoxy)-1,2-propanediol, 4-(2-hydroxyethoxy)-1,2-butanediol or 5-(2-hydroxyethoxy)-1,2-pentanediol.

In addition, the dialkylene glycol, water-soluble alkanetriol, saccharide, and hydroxyalkoxyalkanediol are considered to serve as a dissolving agent for the sparingly water-soluble alkanediol.

In the present invention, the amount of sparingly water-soluble 1,2-alkanediol added is preferably 1 to 3% by mass, more preferably 1.5 to 2.5% by mass, with respect to the total weight of the ink composition. When the amount is within this range, although an ink is applied to a low-absorbent recording medium such as printing paper, printing unevenness can be inhibited and solubility in the ink can be further improved.

In addition, the amount of 1,2-alkanediol added is preferably 0.5 to 6% by mass; more preferably 0.5 to 3% by mass with respect to the total weight of the ink composition. When the amount is within the range, solubility of the sparingly water-soluble 1,2-alkanediol in the ink can be further improved and initial viscosity of the ink can be further reduced.

In addition, the amount of dialkylene glycol added is preferably 2 to 12% by mass, more preferably 3 to 6% by mass with respect to the total weight of the ink composition.

In addition, in the present invention, the amount of water-soluble alkanetriol added is preferably 2 to 12% by mass, more preferably 3 to 6% by mass with respect to the total weight of the ink composition.

In addition, the amount of saccharide added is preferably 2 to 12% by mass, more preferably 3 to 6% by mass with respect to the total weight of the ink composition. When the amount is within this range, solubility of the sparingly water-soluble 1,2-alkanediol can be effectively improved and initial viscosity of the ink can be further reduced.

In addition, the amount of hydroxyalkoxyalkanediol added is preferably 2 to 12% by mass, more preferably 3 to 6% by mass with respect to the total weight of the ink composition.

In addition, the amount of one or more compounds selected from a water-soluble alkanetriol, saccharide, and hydroxyalkoxyalkanediol is preferably 2 to 12%, more preferably 3 to 6% by mass with respect to the total weight of the ink composition.

In addition, a total content of sparingly water-soluble 1,2-alkanediol and water-soluble 1,2-alkanediol is preferably equal to or less than 6% by mass with respect to the total weight of the ink composition. When the total content is within this range, ejection stability is excellent without causing aggregation unevenness to recording media having low ink absorbance such as printing paper as well as plain paper.

In accordance with the present invention, a total content of dialkylene glycol and water-soluble alkanetriol is preferably 3 to 18% by mass, more preferably 4 to 8% mass, with respect to the total weight of the ink composition.

In addition, in accordance with the present invention, a total content of dialkylene glycol and saccharide is preferably 3 to 18% by mass, more preferably 4 to 18% by mass, with respect to the total weight of the ink composition.

In addition, in accordance with the present invention, a total content of dialkylene glycol and hydroxyalkoxyalkanediol is preferably 3 to 18% by mass, more preferably 4 to 8% by mass, with respect to the total weight of the ink composition.

In addition, in accordance with the present invention, a total content of dialkylene glycol and one or more compounds selected from, water-soluble alkanetriol, saccharide and hydroxyalkoxyalkanediol is preferably 3 to 18% by mass, more preferably 4 to 8% by mass, with respect to the total weight of the ink composition.

In addition, in accordance with the present invention, a total content of sparingly water-soluble 1,2-alkanediol, dialkylene glycol and water-soluble alkanetriol is preferably 21% by mass or less, with respect to the weight of the ink composition.

In addition, in accordance with the present invention, a total content of sparingly water-soluble 1,2-alkanediol, dialkylene glycol and saccharide is preferably 21% by mass or less, with respect to the weight of the ink composition.

In addition, in accordance with the present invention, a total content of sparingly water-soluble 1,2-alkanediol, dialkylene glycol and hydroxyalkoxyalkanediol is preferably 21% by mass or less, with respect to the weight of the ink composition.

In addition, in accordance with the present invention, a total content of sparingly water-soluble 1,2-alkanediol, dialkylene glycol and one or more compounds selected from water-soluble alkanetriol, saccharide and hydroxyalkoxyalkanediol is preferably 21% by mass or less, with respect to the weight of the ink composition.

The first color ink composition of the present invention may contain, in addition to the ingredients, a polyvalent alcohol alkyl ether. When the polyvalent alcohol alkyl ether is added to the first color ink composition, recovery from clogging in an ink cap which caps an ink jet head can be improved. As herein used, the term "clogging in the ink cap" refers to a phenomenon in which a waste solution which stays in the cap is dried and solidified, thus causing fine pores of an ink absorbent such as unwoven fabric in the ink cap to be clogged. When recovery from clogging in the ink cap is improved, deterioration in a cleaning success ratio can be prevented and a nozzle clogging recovery property can be improved.

The polyvalent alcohol alkyl ether is preferably a methyl ether of an alkylene glycol and examples thereof include propylene glycol monomethyl ether, ethylene glycol monomethyl ether, diethylene glycol dimethyl ether, dipropylene glycol monomethyl ether, triethylene glycol dimethyl ether, and triethylene glycol monomethyl ether. From the viewpoint of aggregability, a monomethyl ether of alkylene glycol is more preferred, and from the viewpoint of flash point, a methyl ether of triethylene glycol is preferred. From the viewpoints of environmental toxicity and ecological toxicity, triethylene glycol monomethyl ether is preferred.

In addition, in a case where the ink composition contains triethylene glycol monomethyl ether, triethylene glycol monomethyl ether is preferably 0.5 to 9.0% by mass, more preferably 0.5 to 3.0% by mass, with respect to the total weight of the ink composition.

In addition, in a case where the ink composition contains triethylene glycol monomethyl ether, a mix ratio of the triethylene glycol monomethyl ether and the sparingly water-soluble 1,2-alkanediol is preferably 3:1 to 1:6, more preferably 3:1 to 1:1. When the ratio is within this range, recovery from clogging in the ink cap which caps the ink jet head can be further improved.

In addition, in the present invention, a total content of triethylene glycol monomethyl ether and water-soluble 1,2-alkanediol is not particularly limited, and is preferably 9.0% by mass or less, more preferably 3.0% by mass or less, with respect to the total weight of the ink composition. When the ratio is within this range, recovery from clogging in the ink cap which caps the ink jet head can be further improved.

The coloring material contained in the first color ink composition used in the present invention may be any of dyes and pigments. From the viewpoint of light resistance and moisture resistance, use of a pigment is preferred.

The pigment may be selected from inorganic and organic pigments and may be used alone or in combination of two or more thereof. Examples of inorganic pigments include titanium oxide, iron oxide and carbon black prepared by a known method such as a contact method, a furnace method or a thermal method. In addition, examples of organic pigments include azo pigments (including azo lakes, insoluble azo pigments, condensed azo pigments, chelate azo pigments and the like), polycyclic pigments (including phthalocyanine pigments, perylene pigments, perinone pigments, anthraquinone pigments, quinacridone pigments, dioxazine pigments, thio indigo pigments, isoindolinone pigments, and quinophthalone pigments and the like), dye chelates (for example, basic dye chelates and acidic dye chelates), nitro pigments, nitroso pigments, aniline black and the like.

Specifically, the pigment may be suitably selected from depending on the type (color) of ink composition to be obtained. Examples of pigments for a yellow ink composition include C.I. pigment yellow 1, 2, 3, 12, 14, 16, 17, 73, 74, 75, 83, 93, 95, 97, 98, 109, 110, 114, 128, 129, 138, 139, 147, 150, 151, 154, 155, 180, 185 and the like. The pigments may be used alone or in combination of two or more thereof. Of these, use of one or more compounds selected from the group consisting of C.I. pigment yellow 74, 110, 128, and 129 is particularly preferred. In addition, examples of pigments for a magenta ink composition include C.I. pigment red 5, 7, 12, 48(Ca), 48(Mn), 57(Ca), 57:1, 112, 122, 123, 168, 184, 202, 209; C.I. pigment violet 19 and the like and these pigments may be used alone or in combination thereof. Of these, use of one or more compounds selected from the group consisting of C.I. pigment red 122, 202, 209, and C.I. pigment violet 19 is preferred and use of a solid thereof is more preferred. In addition, examples of pigments for a cyan ink composition include C.I. pigment blue 1, 2, 3, 15:3, 15:4, 15:34, 16, 22, 60; C.I. vat blue 4, 60 and the like, and the pigment may be used alone or in combination thereof. Of these, use of C.I. pigment blue 15:3 and/or 15:4 is preferred, and use of C.I. pigment blue 15:3 is particularly preferred.

In addition, examples of pigments for a black ink composition include carbons such as lamp black (C.I. pigment black 6), acetylene black, furnace black (C.I. pigment black 7), channel black (C.I. pigment black 7), carbon black (C.I. pigment black 7), inorganic pigments such as iron oxide pigments; and organic pigments such as aniline black (C.I. pigment black 1), but use of carbon black is preferred in the present invention. Specific examples of carbon black include #2650, #2600, #2300, #2200, #1000, #980, #970, #966, #960, #950, #900, #850, MCF-88, #55, #52, #47, #45, #45 L, #44, #33, #32 and #30 (manufactured by Mitsubishi Chemical Corporation), Special Black 4A, 550, Printex 95, 90, 85, 80, 75, 45 and 40 (manufactured by Degussa Corp.), Regal 660, Mogul L, Monarch 1400, 1300, 1100, 800 and 900 (manufactured by Cabot Corporation), Raven 7000, 5750, 5250, 3500, 3500, 2500 ULTRA, 2000, 1500, 1255, 1200, 1190 ULTRA, 1170, 1100 ULTRA, Raven 5000UIII (manufactured by Columbian Corp.) and the like.

In addition, in the present invention, a pigment which may be dispersed and/or dissolved in an aqueous medium without using the following dispersing agents may be a so-called "surface-treating pigment". The expression "dispersed and/or dissolved in an aqueous medium without any dispersing agent" refers to a state in which dispersoid (pigment) is stably present in the form of particles having a minimal size which may be dispersed in an aqueous medium without using any dispersing agent. The term "dispersing agent" refers to an additive such as a surfactants or polymer, which is generally used to disperse pigment particles in an aqueous medium. In addition, the term "dispersible minimal particle size" refers to a minimum particle size of dispersoid which does not further decrease although a dispersion period increases.

The surface-treating pigment preferably has a structure in which a "hydrophilic functional group and/or a salt thereof" bonded to the surface of the pigment (hereinafter, referred to as a "dispersibility-imparting group"). The dispersibility-imparting group may be directly bonded to the surface of the pigment, or may be bonded thereto via an alkyl group, an alkyl ether group, an aryl group or the like. Examples of the dispersibility-imparting group include one or more selected from the group consisting of a carboxyl group, a carbonyl group, a hydroxyl group, a sulfo group, a phosphate group and quaternary ammonium salts.

The surface-treating pigment is for example prepared by bonding (grafting) active species having a dispersibility-imparting group or the dispersibility-imparting group to the surface of the pigment via physical or chemical treatment of the pigment. The physical treatment is for example vapor plasma treatment. In addition, chemical treatment is for example a method in which the surface of the pigment is oxidized in water by an oxidizing agent to directly bond a carboxyl or sulfo group to the surface of the pigment, or a method in which p-aminobenzoic acid is bonded to the surface of the pigment to bond a carboxyl group via a phenyl group thereto.

The concentration of pigment is not particularly limited, since the concentration (content) thereof may be suitably controlled when the ink composition is prepared. In the present invention, the solid concentration of pigment is preferably 6% by mass or more, more preferably, 12% by mass or more. When ink liquid droplets are adhered on the recording medium, the ink is soaked on the surface of recording medium and spreads therein. However, when the solid concentration of pigment is 6% by mass or more, ink loses its flowability immediately after being soaked and spreads. For this reason, although printing is performed in particular at a low resolution on a recording medium such as printing paper, permeation can be further inhibited.

In a case where a pigment rather than the surface-treating pigment is used, a pigment mixed with the following dispersing agent is preferred, from the viewpoints that gloss of color images, prevention of bronzing and preservation stability of the ink composition can be realized and color images with superior gloss can be formed.

The ink composition of the present invention preferably contains at least one resin selected from styrene-acrylic acid-based copolymer resins, urethane-based resins and fluorene-based resins, as a dispersing agent to disperse the coloring material. These copolymer resins are adsorbed on the pigment to improve dispersibility.

Specific examples of hydrophobic monomers for copolymer resins include methyl acrylate, methyl methacrylate, ethyl acrylate, ethyl methacrylate, n-propyl acrylate, n-propyl methacrylate, iso-propyl acrylate, iso-propyl methacrylate, n-butyl acrylate, n-butyl methacrylate, sec-butyl acrylate, sec-butyl methacrylate, tert-butyl acrylate, tert-butyl methacrylate, n-hexyl acrylate, n-hexyl methacrylate, n-octyl acrylate, n-octyl methacrylate, iso-octyl acrylate, iso-octyl methacrylate, 2-ethylhexyl acrylate, 2-ethylhexyl methacrylate, decyl acrylate, decyl methacrylate, lauryl acrylate, lauryl methacrylate, stearyl acrylate, stearyl methacrylate, 2-hydroxyethyl acrylate, 2-hydroxyethyl methacrylate, 2-hydroxypropyl acrylate, 2-hydroxypropyl methacrylate, 2-dimethylamino ethyl acrylate, 2-dimethylaminoethyl methacrylate, 2-diethylaminoethyl acrylate, 2-diethylaminoethyl methacrylate, glycidyl acrylate, glycidyl methacrylate, allyl acrylate, allyl methacrylate, cyclohexyl acrylate, cyclohexyl methacrylate, phenyl acrylate, phenyl methacrylate, nonylphenyl acrylate, nonylphenyl methacrylate, benzyl acrylate, benzyl methacrylate, dicyclopentenyl acrylate, dicyclopentenyl methacrylate, bornyl acrylate, bornyl methacrylate, 1,3-butanediol diacrylate, 1,3-butanediol dimethacrylate, 1,4-butanediol diacrylate, 1,4-butanediol dimethacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentyl glycol diacrylate, 1,6-hexanediol diacrylate, 1,6-hexanediol dimethacrylate, dipropylene glycol diacrylate, dipropylene glycol dimethacrylate, trimethylolpropane triacrylate, trimethylolpropane trimethacrylate, glycerol acrylate, glycerol methacrylate, styrene, methyl styrene, vinyl toluene and the like. These compounds may be used alone or in combination of two or more thereof.

Specific examples of hydrophilic monomers include acrylic acid, methacrylic acid, maleic acid, itaconic acid and the like.

The copolymer resins of hydrophobic monomers and hydrophilic monomers are preferably at least one selected from styrene-(meth)acrylic acid copolymer resins, styrene-methyl styrene-(meth)acrylic acid copolymer resins, or styrene-maleic acid copolymer resins, (meth)acrylic acid-(meth)acrylic acid ester copolymer resins, or styrene-(meth) acrylic acid-(meth)acrylic acid ester copolymer resins, from the viewpoint that gloss of color images, prevention of bronzing and preservation stability of the ink composition can be realized and, and color images with superior gloss can be formed.

The copolymer resin may be a resin (styrene-acrylic acid resin) obtained by reacting styrene with acrylic acid or an ester of acrylic acid. Otherwise, the copolymer resin may be an acrylic acid-based water-soluble resin. Otherwise, the copolymer resin may be a sodium, potassium, ammonium salt or the like thereof.

The content of copolymer resin is preferably 20 to 50 parts by mass, more preferably 20 to 40 parts by mass, with respect to 100 parts by mass of the pigment, from the viewpoints that gloss of color images, prevention of bronzing and preservation stability of the ink composition can be realized and color images with superior gloss can be formed.

In addition, in the present invention, by using a urethane resin as the pigment dispersing agent, gloss of color images, prevention of bronzing and preservation stability of the ink composition can be realized and color images with superior gloss can be formed. The urethane resin is a resin which contains polymers obtained by reacting a diisocyanate compound with a diol compound, and in the present invention, is preferably a resin having a urethane bond and/or an amide bond, and an acidic group.

Examples of the diisocyanate compound include aliphatic diisocyanate compounds such as hexamethylene diisocyanate, 2,2,4-trimethyl hexamethylene diisocyanate, aromatic diisocyanate compounds such as tolylene diisocyanate and phenylmethane diisocyanate and modified compounds thereof.

Examples of diol compound include polyethers such as polyethylene glycol, polypropylene glycol, polyesters such as polyethylene adipate, polybutylene adipate, and polycarbonates.

The urethane resin preferably has a carboxyl group.

In addition, in the present invention, a fluorene-based resin may be used as the pigment dispersing agent.

A mass ratio of the solids of pigment and the solids of ingredients other than the pigment (solids of pigment/solids of other ingredients) is preferably 100/20 to 100/80 from the viewpoints that gloss of color images, prevention of bronzing and preservation stability of the ink composition can be realized and color images with superior gloss can be formed.

The content of the copolymer resin is preferably 20 to 50 parts by mass, more preferably 20 to 40 parts by mass, with respect to 100 parts by mass of the pigment from the viewpoints that gloss of color images, prevention of bronzing and preservation stability of the ink composition can be realized and, color images with superior gloss can be formed.

The content of urethane resin is preferably 10 to 40 parts by mass, more preferably 10 to 35 parts by mass, with respect to 100 parts by mass of the pigment, from the viewpoints that gloss of color images, prevention of bronzing and preservation stability of the ink composition can be realized and, color images with superior gloss can be formed.

The content of fluorene-based resin is preferably 20 to 100 parts by mass, more preferably 20 to 80 parts by mass, with respect to 100 parts by mass of the pigment from the viewpoints that gloss of color images, prevention of bronzing and preservation stability of the ink composition can be realized and, color images with superior gloss can be formed.

A total content of the copolymer resin and the urethane resin is preferably 90 parts by mass or less (more preferably 70 parts by mass or less), with respect to 100 parts by mass of the pigment, from the viewpoints that gloss of color images, prevention of bronzing and preservation stability of the ink composition can be realized and color images with superior gloss can be formed.

The acid value of the copolymer resin is preferably 50 to 320, more preferably 100 to 250, from the viewpoints that gloss of color images, prevention of bronzing and preservation stability of the ink composition can be realized and color images with superior gloss can be formed.

The acid value of the urethane resin is preferably 10 to 300, more preferably 20 to 100 from the viewpoints that gloss of color images, prevention of bronzing and preservation stability of the ink composition can be realized and color images with superior gloss can be formed. In addition, the term "acid value" refers to an amount (mg) of KOH required for neutralizing 1 g of a resin.

The weight average molecular weight (Mw) of copolymer resin is preferably 2,000 to 30,000, more preferably 2,000 to 20,000 from the viewpoints that gloss of color images, prevention of bronzing and preservation stability of the ink composition can be realized and color images with superior gloss can be formed.

The weight average molecular weight (Mw) of the urethane resin before cross-linking is preferably 100 to 200,000, more preferably 1,000 to 50,000 from the viewpoints that gloss of color images, prevention of bronzing and preservation stability of the ink composition can be realized and color images with superior gloss can be formed. Mw is for example measured by gel permeation chromatography (GPC).

The glass transition temperature (Tg; measured in accordance with JISK 6900) of the copolymer resin is preferably 30° C. or higher, more preferably 50 to 130° C. from the viewpoints that gloss of color images, prevention of bronzing and preservation stability of the ink composition can be realized and color images with superior gloss can be formed.

The glass transition temperature (Tg; measured in accordance with JISK 6900) of the urethane resin is preferably −50 to 200° C., more preferably −50 to 100° C. from the viewpoints that gloss of color images, prevention of bronzing and preservation stability of the ink composition can be realized and color images with superior gloss can be formed.

The copolymer resin may be adsorbed on or isolated from the pigment in the dispersion, and the maximum particle size of the copolymer resin is preferably 0.3 μm or less, the mean particle size thereof is preferably 0.2 μm or less (more preferably 0.1 μm or less) from the viewpoints that gloss of color images, prevention of bronzing and preservation stability of the ink composition can be realized and color images with superior gloss can be formed. In addition, the term "mean particle size" refers to an average of a particle diameter distribution (cumulative 50% diameter) of pigment particles which are practically present in a dispersion and may be for example measured using a Microtrac UPA (manufactured by Microtrac Inc.).

In addition, any fluorene resin may be used without particular limitation so long as it has a fluorene skeleton and may be for example obtained by copolymerizing the following monomer units:

5-isocyanate-1-(isocyanatomethyl)-1,3,3-tri methylcyclohexane (CAS No. 4098-71-9)

2,2'-[9H-fluoren-9-ylidenebis(4,1-phenyleneoxy)]bis ethanol (CAS No. 117344-32-8)

3-hydroxy-2-(hydroxymethyl)-2-methylpropionic acid (CAS No. 4767-03-7)

N,N-diethylethane amine (CAS No. 121-44-8)

In addition, a surfactant may be used as the dispersing agent. Examples of the surfactant include anionic surfactants such as fatty acid salts, higher alkyl dicarboxylic acid salts, higher alcohol sulfuric acid ester salts, higher alkyl sulfonic acid salts, condensates of higher fatty acids and amino acids, sulfosuccinic acid ester salts, naphthenic acid salts, liquid fatty oil sulfuric acid ester salts, and alkyl allyl sulfonic acid salts; cationic surfactants such as fatty acid amine salts, quaternary ammonium salts, sulfonium salts, and phosphonium salts; and nonionic surfactants such as polyoxyethylene alkyl ethers, polyoxyethylene alkyl esters, sorbitan alkyl esters, and polyoxyethylene sorbitan alkyl esters. When the surfactant is added to the ink composition, it naturally serves as a surfactant.

The first color ink composition used for the present invention contains a surfactant, in addition to the sparingly water-soluble 1,2-alkanediol as an essential ingredient. The color ink composition containing sparingly water-soluble 1,2-alkanediol and the surfactant is applied to plain paper in combination with the following reactive solution to improve color properties or permeation.

Polyorganosiloxane surfactants are preferred as the surfactant used in the present invention. When an image is formed, the wettability to the recording medium surface is increased and the permeability of the ink can be increased. In the case where a polyorganosiloxane surfactant is used, the solubility of the surfactant in the ink improves due to incorporation of the ingredient, and generation of the insoluble matter or the like can be suppressed. Thus, an ink composition having higher ejection stability can be realized.

The surfactant may be commercially available and examples thereof include Olfine PD-501, Olfine PD-502, Olfine PD-570 (all of them, manufactured by Nissin Chemical Industry CO., Ltd.) and BYK-347, BYK-348 (all of them, manufactured by BYK Japan KK).

In addition, the polyorganosiloxane surfactant contains at least one compound represented by the following formula (I):

[Chem 1]

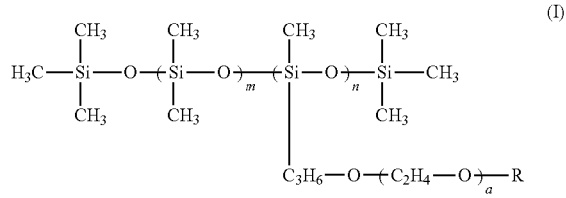

wherein R represents a hydrogen atom or a methyl group, a represents an integer of 2 to 11, m represents an integer of 2 to 50 and n represents an integer of 1 to 5, or contains more preferably at least one compound represented by formula (I) wherein R represents a hydrogen atom or a methyl group, a represents an integer of 2 to 13, m represents an integer of 2 to 50, and n represents an integer of 1 to 5. In addition, the polyorganosiloxane surfactant more preferably contains at least one compound represented by formula (I) wherein R represents a hydrogen atom or a methyl group, a represents an integer of 2 to 13, m represents an integer of 2 to 50, and n represents an integer of 1 to 8. Otherwise, the polyorganosiloxane surfactant more preferably contains at least one compound represented by formula (I) wherein R represents a methyl group, a represents an integer of 6 to 18, m is 0 and n is 1. With such a polyorganosiloxane surfactant, uneven aggregation of ink is suppressed.

As the compound of formula (I), a compound wherein a represents an integer of 2 to 5, m represents an integer of 20 to 40 and n represents an integer of 2 to 4, a compound wherein a represents an integer of 7 to 11, m represents an integer of 30 to 50 and n represents an integer of 3 to 5, a compound wherein a represents an integer of 9 to 13, m represents an integer of 2 to 4, n represents an integer of 1 to 2, or a compound wherein a represents an integer of 6 to 10, m represents an integer of 10 to 20 and n represents an integer of 4 to 8 is more preferred. When the compound is used, uneven aggregation of ink can be further suppressed.

In addition, as the compound of formula (I), a compound wherein R represents a hydrogen atom, a represents an integer of 2 to 5 and m represents an integer of 20 to 40, n represents an integer of 2 to 4, or a compound wherein a represents an integer of 7 to 11, m represents an integer of 30 to 50, and n represents an integer of 3 to 5 is more preferred. When such a compound is used, uneven aggregation and permeation of ink can be suppressed.

In addition, as the compound of formula (I), a compound wherein R represents a methyl group, a represents an integer of 9 to 13, m a represents an integer of 2 to 4 and n a represents an integer of 1 to 2, or a compound wherein a represents an integer of 6 to 10, m represents an integer of 10 to 20 and n represents an integer of 4 to 8 is more preferred. When such a compound is used, uneven aggregation and permeation of ink can be suppressed.

In addition, as the compound of formula (I), a compound wherein R represents a methyl group, a represents an integer of 6 to 12, m represents 0 and n represents 1 is even more preferred. When such a compound is used, uneven aggregation and permeation of ink can be suppressed.

In addition, the compound of formula (I) wherein R represents a hydrogen atom, a represents an integer of 7 to 11, m represents an integer of 30 to 50, and n represents an integer of 3 to 5 is preferred. The compound of formula (I) wherein R represents a methyl group, a represents an integer of 9 to 13, m represents an integer of 2 to 4, and n represents an integer of 1 to 2, and the compound of formula (I) wherein R represents a methyl group, a represents an integer of 6 to 10, m represents an integer of 10 to 20, and n represents an integer of 4 to 8 are most preferred. When the compound is used, uneven aggregation and permeation of ink can be further suppressed.

The content of surfactant in the ink composition of the present invention is preferably 0.01 to 1.0% by mass, more preferably 0.05 to 0.50% by mass.

In addition, the surfactant in the present invention may include a gemini surfactant. When a gemini surfactant is used in combination with the ingredient, the sparingly water-soluble solvent can be dispersed evenly and as a result the initial viscosity of the ink can be lowered. Accordingly, the amount of the coloring materials and anti-clogging agents added to the ink composition can be increased, and images with excellent color properties can be produced even on a recording medium with a porous surface coated with a resin or particles for receiving inks. In addition, the term "gemini surfactant" refers to a surfactant having a structure in which two surfactant molecules are bonded to each other through a linker.

The gemini surfactant is preferably a two-chain three-hydrophilic group-type surfactant in which hydrophilic moieties of a pair of single-chain surfactants are bonded to each other through a linker having a hydrophilic group. The hydrophilic moiety of the single chain type surfactant is preferably an acidic amino acid residue and the linker is preferably a basic amino acid. Specific examples thereof include surfactants synthesized by bonding a pair of single chain surfactants having glutamic acid or aspartic acid in the hydrophilic moiety to each other through a linker such as arginine, lysine, or histidine. It is preferable to use a surfactant represented by chemical formula (II) below as the gemini surfactant:

[Chem 2]

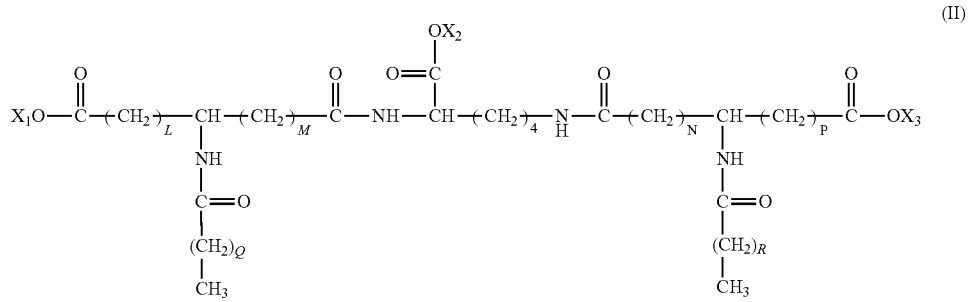

(II)

(wherein $X_1$, $X_2$, and $X_3$ each independently represent a hydrogen atom or an alkali metal but do not simultaneously represent a hydrogen atom or an alkali metal, L and M each independently represent 0 or 2 but do not simultaneously represent 0 or 2, N and P each independently represent 0 or 2 but do not simultaneously represent 0 or 2, and Q and R each represent an integer of 8 to 18).

In formula (II), the alkali metal is preferably Na and Q and R are each preferably about 10. Examples of such a compound include sodium salts of condensates of N-lauroyl-L-glutamic acid and L-lysine. Commercially available products may be used as the compound represented by the formula above. For example, Pellicer L-30 (manufactured by Asahi Kasei Chemicals Corporation) which is an aqueous solution containing 30% sodium salt of a condensate of N-lauroyl-L-glutamic acid and L-lysine is suitable for use.

When the gemini surfactant is used, in forming an image to be recorded, the wettability to the recording medium surface is increased and the permeability of the ink can be increased. As a result, solubility of the surfactant in the ink improves and generation of the insoluble matter or the like can be suppressed. Thus, an ink composition having higher ejection stability can be realized.

The first color ink composition may further contain another surfactant, more specifically, an acetylene glycol surfactant, an anionic surfactant, a nonionic surfactant, an ampholytic surfactant, or the like.

Examples of the acetylene glycol surfactant among these surfactants include 2,4,7,9-tetramethyl-5-decyn-4,7-diol, 3,6-dimethyl-4-octyn-3,6-diol, 3,5-dimethyl-1-hexyn-3-ol, and 2,4-dimethyl-5-hexyn-3-ol. Commercially available products may also be used as the acetylene glycol surfactant. Examples thereof include Olfine E1010, STG, and Y (trade names, manufactured by Nissin Chemical Industry Co., Ltd.), and Surfynol 61, 104, 82, 465, 485, and TG (trade names, manufactured by Air Products and Chemicals Inc.).

In addition, the first color ink composition may further contain a penetrant in addition to the components described above. Examples of useful penetrants include a variety of surfactants such as anionic surfactants, cationic surfactants, ampholytic surfactants, alcohols such as methanol, ethanol, iso-propyl alcohol and glycol ethers. Specific examples of glycol ethers include ethylene glycol monomethyl ether, ethylene glycol monoethyl ether, ethylene glycol mono-iso-propyl ether, ethylene glycol mono-n-butyl ether, ethylene glycol mono-iso-butyl ether, ethylene glycol mono-tert-butyl ether, ethylene glycol monomethyl ether acetate, diethylene glycol monomethyl ether, diethylene glycol monoethyl ether, diethylene glycol mono-n-propyl ether, diethylene glycol mono-iso-propyl ether, diethylene glycol mono-n-butyl ether, diethylene glycol mono-tert-butyl ether, triethylene glycol mono-n-butyl ether, propylene glycol monomethyl ether, propylene glycol monoethyl ether, propylene glycol mono-n-propyl ether, propylene glycol mono-iso-propyl ether, propylene glycol mono-n-butyl ether, propylene glycol mono-tert-butyl ether, dipropylene glycol monomethyl ether, dipropylene glycol monoethyl ether, dipropylene glycol mono-n-propyl ether, dipropylene glycol iso-propyl ether, dipropylene glycol mono-n-butyl ether, dipropylene glycol mono-tert-butyl ether, 1-methyl-1-methoxy butanol and the like. These compounds may be used singly or in combination of two or more.

Of the glycol ethers, polyvalent alcohol alkyl ether is preferred, and ethylene glycol monoethyl ether, ethylene glycol mono-n-butyl ether, diethylene glycol monomethyl ether, diethylene glycol monoethyl ether, diethylene glycol mono-n-butyl ether, propylene glycol monomethyl ether, propylene glycol monoethyl ether, propylene glycol mono butyl ether, triethylene glycol monomethyl ether, triethylene glycol monoethyl ether, or triethylene glycol mono-n-butyl ether is particularly preferred. Triethylene glycol mono-n-butyl ether is more preferred. In addition, when the polyvalent alcohol alkyl ether is added to the ink composition, the polyvalent alcohol alkyl ether also naturally serves as a penetrant.

In addition, glycol ethers as the penetrant partially overlap polyvalent alcohol alkyl ethers in terms of aggregability, flash point, and environmental toxicity and ecological toxicity, but glycol ethers having the two effects are present.

The amount of the penetrant added may be appropriately determined but is preferably about 0.1 to 30% by mass and more preferably about 1 to 20% by mass.

In addition, the first color ink composition preferably further contains a recording medium-dissolving agent in addition to the components described above. Pyrrolidones such as N-methyl-2-pyrrolidone are preferably used as the recording medium-dissolving agent. The amount of the recording medium-dissolving agent added may be appropriately determined but is preferably about 0.1 to 30% by mass, more preferably about 1 to 20% by mass.

The first color ink composition may contain a humectant and is selected from those used commonly for the ink composition for ink jet recording. Specific examples of humectants include glycerin, ethylene glycol and water-soluble alkanediols having 3 to 5 carbon atoms such as 1,3-propanediol, 3-methyl-1,3-butanediol, 1,3-butanediol and 1,2-pentanediol.

The first color ink composition contains water as a solvent in addition to the coloring material, the sparingly water-soluble 1,2-alkanediol and the surfactants as essential ingredients, and other additives described above. Water is preferably pure water or ultrapure water such as ion exchange water, ultrafiltered water, reverse osmosis water, and distilled water. Any one of these water types sterilized by ultraviolet irradiation, hydrogen peroxide addition, or the like is preferred since generation of mold and bacteria can be prevented for a long time.

The first color ink composition may further contain a nozzle clogging-preventing agent, a preservative, an antioxidant, a conductivity adjustor, a pH adjustor, a viscosity adjustor, a surface tension adjustor, an oxygen absorber, and the like.

Examples of the preservative and fungicide include sodium benzoate, sodium pentachlorophenol, sodium 2-pyridinethiol-1-oxide, sodium sorbate, sodium dehydroacetate, and 1,2-dibenzinethiazolin-3-one (Proxel CRL, Proxel BND, Proxel GXL, Proxel XL-2, and Proxel TN manufactured by ICI).

In addition, examples of the pH adjustor, dissolving aids, and the anti-oxidants include amines such as diethanolamine, triethanolamine, propanolamine, and morpholine and their modified products; inorganic salts such as potassium hydroxide, sodium hydroxide, and lithium hydroxide; ammonium hydroxide and quaternary ammonium hydroxide (e.g., tetramethyl ammonium); carbonates such as potassium carbonate, sodium carbonate, and lithium carbonate; other phosphates; N-methyl-2-pyrrolidone; ureas such as urea, thiourea, and tetramethylurea; allophanates such as allophanate and methyl allophanate; biurets such as biuret, dimethyl biuret, and tetramethyl biuret; and L-ascorbic acid and salts thereof.

In addition, the first color ink composition may contain an antioxidant and an ultraviolet absorber. Examples thereof include Tinuvin 328, 900, 1130, 384, 292, 123, 144, 622, 770, and 292, Irgacor 252 and 153, and Irganox 1010, 1076, 1035, and MD1024 manufactured by Ciba Specialty Chemicals, and oxides of lanthanides.

The first color ink composition can be manufactured by dispersing and mixing the components described above by adequate techniques. Preferably, first, a pigment, a polymer dispersant, and water are mixed with each other in an adequate dispersing device (e.g., a ball mill, a sand mill, an attritor, a roll mill, an agitator mill, a Henschel mixer, a colloid mill, an ultrasonic homogenizer, a jet mill, or an angstrom mill) to prepare a homogeneous pigment dispersion, and then a resin (resin emulsion) separately prepared, water, a water-soluble organic solvent, a sugar, a pH adjustor, a preservative, a fungicide, and the like are added thereto to be sufficiently dissolved and to thereby prepare an ink solution. After thorough stirring, the mixture is filtered to remove coarse particles and foreign matter that cause clogging to obtain a desired ink composition. The filtration is preferably conducted with a glass fiber filter as a filter. The glass fiber is preferably resin-impregnated glass fiber from the viewpoint of electrostatic absorption functions. The pore diameter of the glass fiber filter is preferably 1 to 40 micrometers and more preferably 1 to 10 micrometers from the viewpoints of productivity and removal of charged free resins by adsorption. The charged free resins are insufficiently removed by adsorption and ejection stability may be thus deteriorated. An example of the filter is Ultipor GF Plus manufactured by Pall Corporation.

Second Color Ink Composition

The ink set of the present invention may contain, in addition to the first color ink composition, a second color ink composition, as a color ink. The second color ink composition at least contains a coloring material and water and does not contain the sparingly water-soluble 1,2-alkanediol. In addition, the second color ink composition is applied in combination with the following reactive solution to a low-absorbent recording medium such as printing paper. In related art, an ink containing sparingly water-soluble 1,2-alkanediol such as 1,2-octanediol as mentioned above is known as an ink composition suitable for low-absorbent recording media and images with superior gloss or color reproductivity can be obtained when recording on low-absorbent recording media using such an ink. The present invention is based on the discovery that images with superior color properties and improved permeation can be obtained, when the ink composition containing no sparingly water-soluble 1,2-alkanediol is applied in combination with a reactive solution containing a specific reactant to low-absorbent recording media.

The second color ink composition contains a coloring material and water as essential ingredients, but contains the same ingredients as the first color ink composition, except that it does not contain sparingly water-soluble 1,2-alkanediol and the mentioned ingredients such as alcohols, surfactants, penetrants, recording medium dissolving agents, and humectants. In addition, the coloring material and water may be the same as in the first color ink composition.

Reactive Solution

The ink set of the present invention contains, in addition to the first and second color ink composition, a reactive solution. The reactive solution used in the present invention at least basically contains a polyvalent metal salt. The polyvalent metal salt-containing reactive solution and the first color ink composition are applied to plain paper to obtain images with superior color properties and improved permeation. In addition, the polyvalent metal salt-containing reactive solution and the second color ink composition are applied to low-absorbent recording media, to obtain images with superior color properties and improved permeation.

The polyvalent metal salt consists of polyvalent (bi- or more valent) metal ions and anions bonded thereto, and is dissolved in water. Specific examples of polyvalent metal ions include bivalent metal ions such as $Ca^{2+}$, $Cu^{2+}$, $Ni^{2+}$, $Mg^{2+}$, $Zn^{2+}$ and $Ba^{2+}$ and trivalent metal ions such as $Al^{3+}$, $Fe^{3+}$ and $Cr^{3+}$. Examples of anions include $Cl^-$, $NO_3^-$, $I^-$, $Br^-$, $ClO_3^-$, nitrate ions, carboxylic ions and the like.

The carboxylic ions are preferably derived from saturated aliphatic monocarboxylic acids having 1 to 6 carbon atoms or cyclic monocarboxylic acids having 7 to 11 carbon atoms. Preferred examples of saturated aliphatic monocarboxylic acids having 1 to 6 carbon atoms include formic acid, acetic acid, propionic acid, butyric acid, isobutyric acid, valeric acid, isovaleric acid, pivalic acid, hexanoic acid and the like. Formic acid and acetic acid are particularly preferred. A hydrogen atom present in a saturated aliphatic hydrocarbon group of a monocarboxylic acid may be substituted by a hydroxyl group and such a carboxylic acid is preferably lactic acid. In addition, preferred examples of cyclic monocarboxylic acid having 6 to 10 carbon atoms include benzoic acid, naphthoic acid and the like, and benzoic acid is more preferred.

Of these polyvalent metal ions, metal salts composed of $Ca^{2+}$ or $Mg^{2+}$ are preferred from two viewpoints: pH of reactive solution and the qualities of printed materials obtained.

The concentration of polyvalent metal salts in the reactive solution is suitably determined within the range that effects of recording qualities and clogging prevention can be obtained, and is preferably about 0.1% by mass to about 40% by mass, more preferably about 5% by mass to about 25% by mass.

In the present invention, the reactive solution, in addition to the polyvalent metal salt, may contain polyols and examples thereof include glycerine, diethylene glycol, triethylene glycol, 1,5-pentanediol, 1,4-butanediol, saccharides and the like. Preferred examples of saccharides include monosaccharides, disaccharides, oligosaccharides (including trisaccharides and tetrasaccharides) and polysaccharides, preferably glucose, mannose, fructose, ribose, xylulose, arabinose, galactose, aldonic acid, glucitol, sorbitol, maltose, cellobiose, lactose, sucrose, trehalose, maltotriose the like.

These polyols may be added alone or in a combination of two or more types. When polyols are added as a combination of two or more types, the added amount thereof is 1 or more, as a total entity (by mass), with respect to the polyvalent metal salt.

In addition, in the present invention, the reactive solution may contain humectants, as mentioned above. When the humectant is contained in the reactive solution, drying of the reactive solution is prevented and clogging of a head is suppressed. The amount of humectants added is not particularly limited, is preferably about 0.5 to about 40% by mass, more preferably about 2 to about 20% by mass.

In addition, in the present invention, the reactive solution may contain an organic solvent having a low melting point such as methanol, ethanol, n-propyl alcohol, iso-propyl alcohol, n-butanol, sec-butanol, tert-butanol, iso-butanol and n-pentanol. The addition of the organic solvent having a low melting point enables an ink drying time to be shortened. The amount of organic solvent having a low melting point added is preferably 0.5 to 10% by mass, more preferably 1.5 to 6% by mass.

In addition, the reactive solution may contain a surfactant or penetrant and further may contain triethanolamine to adjust pH. In addition, the reactive solution is colored by adding the coloring material mentioned in the paragraph associated with the ink composition and has the capability of the ink composition.

Ink Jet Recording Method

The ink jet recording method of the present invention is an ink jet method for recording images on a recording medium using an ink set containing the reactive solution and the first and second color ink compositions, the reactive solution contains a polyvalent metal salt, the first color ink contains at least a coloring material, sparingly water-soluble 1,2-alkanediol, a surfactant and water, the second color ink at least contains a coloring material and water, when the recording medium is plain paper, the recording is performed by adhering the reactive solution and the first color ink to the recording medium, and when the recording medium is a low-absorbent recording medium, the recording is performed by adhering the reactive solution and the second ink to the recording medium.

The recording method of the present invention is performed using an ink jet printer. The ink jet printer, as well-known in the art, is a printing apparatus in which liquid droplets of an ink are ejected from an outlet of a recording head (ink jet head) and the droplets are adhered to a recording medium to form an image. Ink jet printers are divided into continue-type printers in which an ink is continuously ejected from nozzles of a recording head at a predetermined interval of predetermined period and the ejected ink liquid droplets are directed in one direction to form an image, and on-demand type printers in which an ink is ejected in response to image data. The present invention is preferably an on-demand type ink jet printer which enables detailed injection controlling and thus leaves little waste liquid. In addition, a method for ejecting an ink from a recording head is an electro-mechanical transduction mode using piezoelectric devices such as piezo devices, or an electrothermal transduction mode using electrothermal transduction devices such as heaters or the like. Any mode of an ink jet printer provided with a recording head may be used in the present invention. In addition, in the case of using an aqueous pigment ink, use of a recording head of an electro-mechanical transduction is generally preferred from the viewpoint of ejection stability or the like.

In the recording method of the present invention, plain paper is used as the recording medium on which the reactive solution and the first color ink composition are adhered. Examples of useful plain paper include high-quality paper, recycled paper, copy paper, bond paper, paper boards, Japanese paper, non-woven fabric and the like. A well-known paper for ink jet exhibiting superior ink absorbance and having an ink-accepting layer containing, as a main ingredient, porous particles such as silica may be used.

A low-absorbent recording medium is used as the recording medium to which the reactive solution and the second color ink composition are adhered. The term "low-absorbent recording medium" refers to, as mentioned above, a recording medium whose recording surface absorbs water of 10 mL/m² or less from contact initiation to 30 $msec^{1/2}$, in accordance with Bristow's method. This Bristow's method is the most general method for measuring absorbed liquid amount for a short period of time and is also adopted by the Japan Technical Association of the Pulp and Paper Industry (JAPAN TAPPI). Details of the test method is described in "JAPAN TAPPI paper and pulp test method, 2000" Vol. No. 51 "Paper and paperboard-liquid absorbance, Bristow's Method".

The low-absorbent recording medium is for example coated paper and examples thereof include recording-base paper such as slightly-coated paper, art paper, coat paper, matt paper and the cast paper (this recording-base paper is referred to as a "printing paper").

Coated paper is a paper whose surface is coated with a coating material to improve aesthetic sense or evenness. The coating material may be prepared by mixing pigments such as talc, pyrophyllite, clay (kaolin), titanium oxide, magnesium carbonate, calcium carbonate, with an adhesive agent such as starches and polyvinyl alcohol. The coating material is coated using a so-called "coater" machine in the manufacturing of paper. Coaters are divided into on-machine coaters directly connected to a paper machine to perform papermaking and coating in one step and off-machine coaters in which papermaking is performed in a separate process. Coaters are mainly used for recording and are classified by coated paper for printing in "Production dynamics statistics" in Ministry of Economy, Trade and Industry.

The term "slightly-coated paper" refers to recording paper coated with a coating material of 12 g/m² or less. The term "art paper" refers to recording paper in which a high-quality recording paper (high-quality paper, chemical pulp usage percentage of 100%) is coated with a coating of about 40 g/m². The term "coat paper" refers to recording paper coated with a coating of about 20 g/m² to about 40 g/m². The term "cast paper" refers to recording paper in which a pressure is applied to the surface of art paper or coat paper using a so-called "cast drum" machine to subject the paper to finishing and thereby improve gloss or recording effects.

Printing paper is preferably used as a low-absorbent recording medium. Art paper, high-quality paper for print-on-demand (POD) applications, or specialty paper for laser printers may be used. Examples of the printing paper include OKT+ (Oji Paper Co., Ltd.). Examples of the high-quality paper for POD applications include Ricoh Business Coat Gloss 100 (manufactured by Ricoh Corporation Ltd.). Examples of the specialty paper for laser printers include LPCCTA4 (manufactured by SEIKO EPSON CORPORATION).

The reactive solution may be adhered in a uniform amount over the entire surface to be recorded in a recording medium or be selectively adhered only in regions where an ink is adhered. The amount of reactive solution adhered is suitably controlled within the range, allowing the desired effects to be obtained and is preferably 0.05 to 5 g/m² in terms of solid.

In the present invention, the reactive solution and the first or second color ink composition are applied such that the reactive solution comes in contact with the first or second color ink composition on the recorded surface of a recording medium, the reactive solution and the color ink composition may be sequentially applied onto the recorded surface of the recording medium, or the color ink composition and the reactive solution may be sequentially applied.

In addition, the period after application of one of two liquids which are brought into contact with each other, before the other is applied, is varied depending on the ejection amount, the type of recording medium or the like, is preferably 5 ms to 60 seconds, more preferably 50 ms to 500 ms. When this time lag is shorter than 5 ms, before droplets of early applied liquid permeate into the recording medium, droplets of the other liquid may land in the droplets of early applied liquid, and the ink or reactive solution may overflow on the recording medium, thus adversely affecting image qualities or a drying property. On the other hand, when the time lag exceeds 60 seconds, after droplets of the early applied liquid completely permeate into the recording medium, droplets of the other liquid may be ejected, thus failing to obtain a desired image quality enhancement effect.

EXAMPLES

Hereinafter, the present invention will be described with reference Examples in detail, but is not limited thereto.
Preparation of Ink Composition and Reactive Solution Ingredients were mixed and stirred for 2 hours, as shown in the Table below. Then, the mixture was filtered with a membrane filter having a pore diameter of about 12 MEMBRANE FILTER (trade name, manufactured by Japan Millipore Limited) to prepare yellow ink 1 and 2, and a reactive solution. Numerical figures in Table below indicate content (mass %) in the ink. The resin content is indicated in terms of solid content (mass %). The styrene-acrylic acid-based resin in the Table is a copolymer having a molecular weight of 1600 and an acid value of 150. In addition, the fluorene-based resin in the Table is a resin having a molecular weight of 3300 and containing about 50% mass of a monomer having a fluorene skeleton indicated as CAS No. 117344-32-8. In addition, the surfactant contained in the ink composition and reactive solution is a polyorganosiloxane surfactant, as a combination of a compound of formula (I) wherein R represents a hydrogen atom, a represents an integer of 7 to 11, m represents an integer of 30 to 50, and n represents an integer of 3 to 5, and a compound of formula (I) wherein R represents a methyl group, a represents an integer of 9 to 13, m represents an integer of 2 to 4, and n represents an integer of 1 to 2.

TABLE

| Ingredients | First ink (Y) | Second ink (Y) | Reactive solution |
|---|---|---|---|
| C.I. pigment yellow | 7.0 | 7.0 | — |
| Dispersed resin Styrene-acrylic acid-based resin | 1.4 | 1.4 | — |
| Fluorene-based resin | 1.4 | 1.4 | — |
| 1,2-Hexanediol | 1.0 | 9.0 | 5.0 |
| 1,2-Octanediol | 2.5 | — | — |
| Glycerine | 5.0 | 5.0 | 10.0 |
| Dipropylene glycol | 3.0 | 3.0 | — |
| 1,2,6-Hexanetriol | 2.5 | 2.5 | — |
| Surfactant | 0.2 | 0.2 | 0.2 |
| Magnesium sulfate | — | — | 5.0 |
| Water | 76.0 | 70.5 | 79.8 |
| Total | 100.0 | 100.0 | 100.0 |

In addition, regarding the first ink (Y), a first ink (C) was obtained in the same manner as mentioned above, except that C.I. pigment blue 15:3 was used instead of C.I. pigment yellow 74. In addition, regarding the second ink (Y), a second ink (C) was obtained in the same manner as mentioned above, except that C.I. pigment blue 15:3 was used instead of C.I. pigment yellow 74.

<Evaluation of Recording Quality>

Respective ink and reactive solutions thus obtained were used for an ink set and ink cartridge nozzles A to J of an ink jet printer (PX-H10000, manufactured by SEIKO EPSON CORPORATION) were assigned as follows.

Nozzle A: reactive solution
Nozzle B: reactive solution
Nozzle C: first ink (C)
Nozzle D: first ink (C)
Nozzle E: first ink (Y)
Nozzle F: first ink (Y)
Nozzle G: second ink (C)
Nozzle H: second ink (C)
Nozzle I: second ink (Y)
Nozzle J: second ink (Y)

Beta-printing was performed at 1440×720 dpi at a single color duty of 0% to 100%, at a secondary color duty of 0% to 200% to plain paper (XeroxP) and printing paper (OKT+) using the ink jet printer to obtain samples for testing.

In single color recording, ejection of liquid droplets from respective nozzles was carried out in the following four manners.

1. Nozzles A, B, C and D (combination of reactive solution and first ink (C))
2. Nozzles A, B, G and H (combination of reactive solution and second ink (C))
3. Nozzles C and D (only first ink (C))
4. Nozzles G and H (only second ink (C))

In addition, secondary color recording, ejection of liquid droplets from respective nozzles was carried out by the following four manners.

5. Nozzles A, B, C, D, E and F (combination of reactive solution, first ink (C) and first ink (Y))

6. Nozzles A, B, G, H, I and J (combination of reactive solution, second ink (C) and second ink (Y))

7. Nozzles C, D, E and F (only first ink (C) and first ink (Y))

8. Nozzles G, H, I and J (only second ink (C) and second ink (Y))

Subsequently, an optical density (OD value) of the samples for test thus obtained was measured using a spectrophotometer (Spectrolino, manufactured by Macbeth Corp.). The measurement conditions were as follows:

Light source: D50
Density filter: DIN16536
UV cut filter: present
White color base: absolute value In addition, the term "duty" is a value calculated by the following equation.

Duty(%)=number of actually recorded dots/(length resolution×width resolution)×100

(wherein number of actually recorded dots means the number of dots actually recorded in a unit area, and length resolution and width resolution are a resolution in a unit area)

Figure 2:
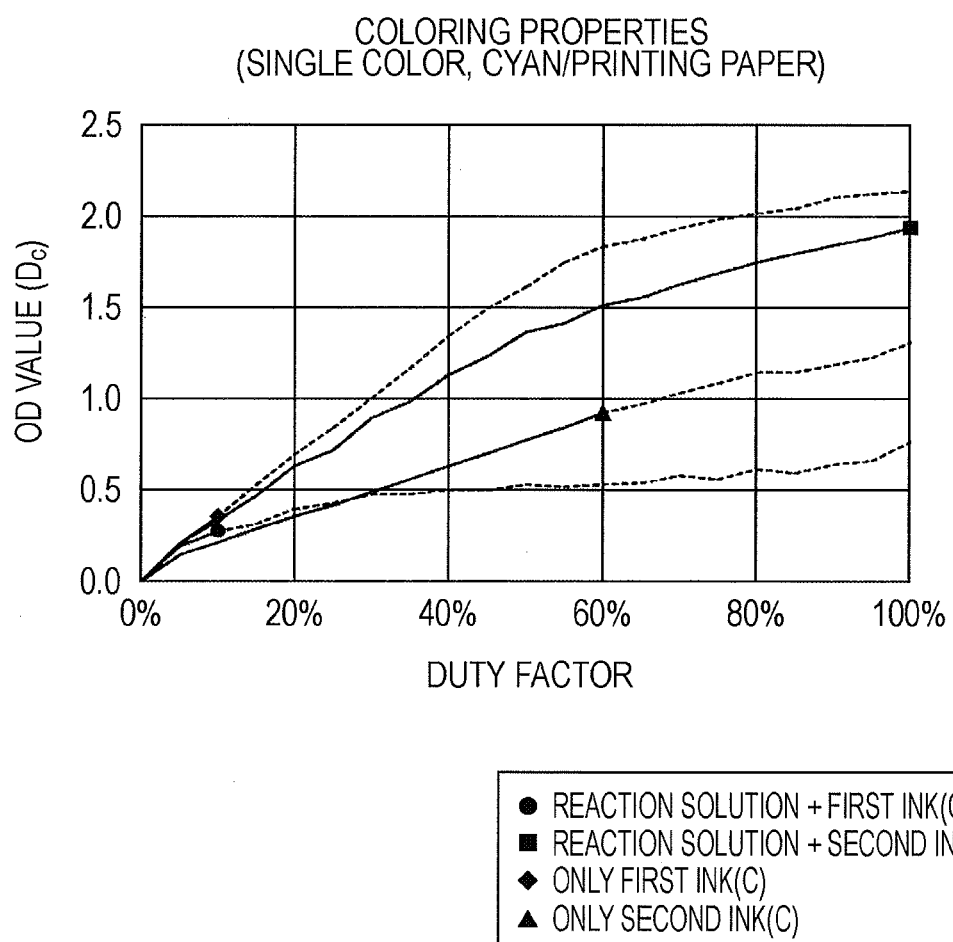
FIG. 2 is a graph showing colorimetric values ($D_c$) of cyan at respective single color duties when printing paper is used as a recording medium.

FIG. 1 shows colorimetric values ($D_c$) of cyan at respective single color duties, when plain paper is used as a recording medium. FIG. 2 shows colorimetric values ($D_c$) of cyan at respective single color duties, when printing paper is used as a recording medium.

Figure 3:
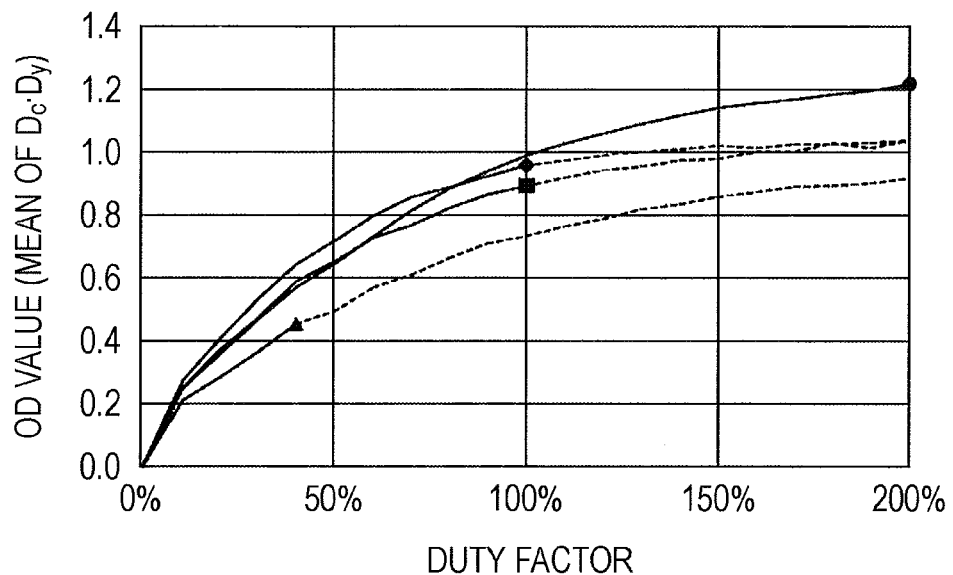
FIG. 3 is a graph showing an average of colorimetric values ($D_c$) of cyan and colorimetric values ($D_y$) of yellow at a secondary color (green) duty, when plain paper is used as a recording medium.
Figure 4:
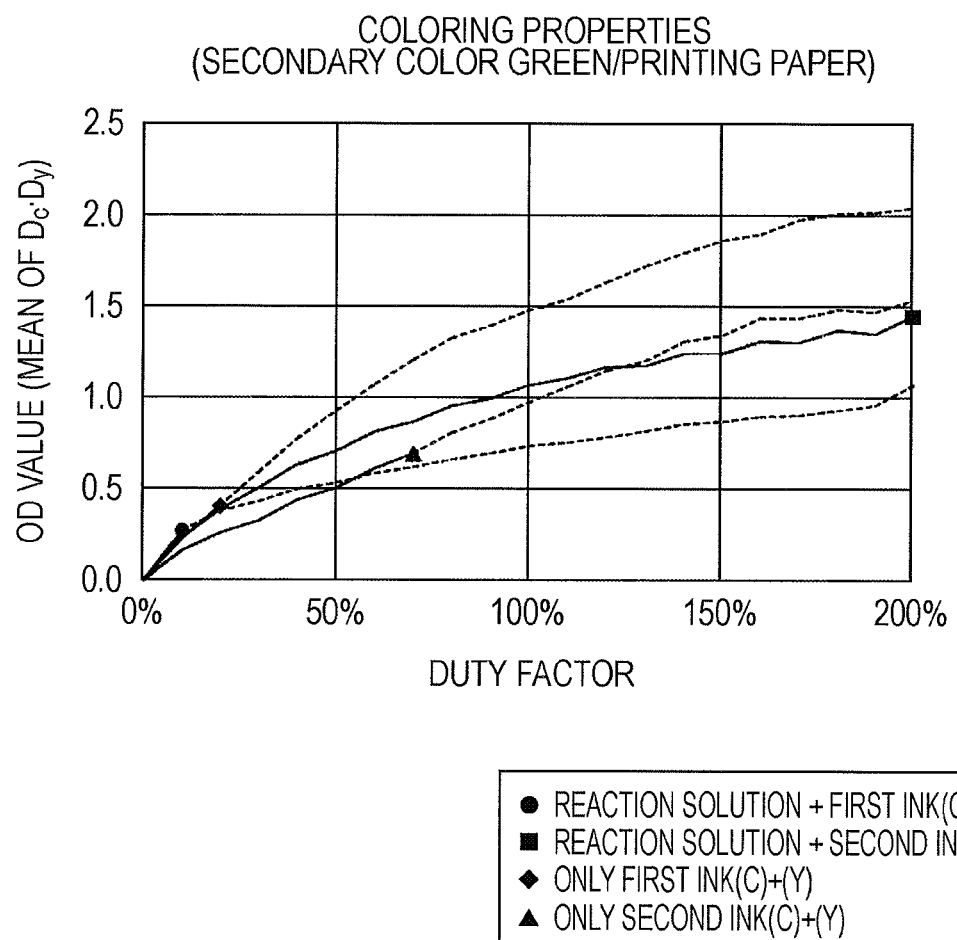
FIG. 4 is a graph showing an average of colorimetric values ($D_c$) of cyan and colorimetric values ($D_y$) of yellow at a secondary color (green) duty, when printing paper is used as a recording medium.

FIG. 3 shows an average of colorimetric values ($D_c$) of cyan and colorimetric values ($D_y$) of yellow at a secondary color (green) duty, when plain paper is used as a recording medium. FIG. 4 shows an average of colorimetric values ($D_c$) of cyan and colorimetric values ($D_y$) of yellow at a secondary color (green) duty, when printing paper is used as a recording medium. In addition, in FIGS. 1 to 4, dotted lines in graphs represent regions where in samples for tests, normal recording qualities could not be secured due to permeation or uneven aggregation.

As shown in FIGS. 1 and 3, it could be seen that, when a recording medium is plain paper, recorded materials printed using an ink set containing a combination of an ink containing sparingly water-soluble 1,2-alkanediol and a surfactant and a reactive solution containing a polyvalent metal salt can realize high-quality images free of permeation or uneven aggregation and exhibit high optical density even at a high duty, as compared to recorded materials printed using other ink sets.

In addition, as shown in FIGS. 2 and 3, when a recording medium is printing paper, recorded materials printed using an ink set containing a combination of an ink containing no sparingly water-soluble 1,2-alkanediol and a reactive solution containing a polyvalent metal salt can realize high-quality images free of permeation or uneven aggregation and exhibit high optical density even at a high duty, as compared to recorded materials printed using other ink sets.

What is claimed is:

1. An ink jet recording method in which an image is recorded on a recording medium using an ink set consisting of a reactive solution and first and second color ink compositions, wherein the reactive solution contains a polyvalent metal salt and a polyol, the first color ink at least contains a coloring material, a sparingly water-soluble 1,2-alkanediol, a surfactant, water, and a hydroxyalkoxyalkanediol selected from the group consisting of 3-(2-hydroxyethoxy)-1,2-propanediol, 4-(2-hydroxyethoxy)-1,2-butanediol, and 5-(2-hydroxyethoxy)-1,2-pentanediol, second color ink at least contains a coloring material and water, when the recording medium is plain paper, recording is carried out by adhering only the reactive solution and first color ink to the plain paper recording medium, and when the recording medium is a low-absorbent recording medium, the recording is carried out by adhering only the reactive solution and the second ink to the low absorbent recording medium.

2. The method according to claim 1, wherein the first or second color ink composition is adhered to the recording medium, before and/or after adhering the reactive solution to the recording medium.

3. The method of claim 1, wherein the sparingly water-soluble 1,2-alkanediol has 7 or more carbon atoms.

4. The method of claim 1, wherein the sparingly water-soluble 1,2 alkanediol has 7 to 9 carbon atoms.

5. The method of claim 1, wherein the second color ink does not contain the sparingly water-soluble 1,2-alkanediol.

6. The method of claim 1, wherein the sparingly water-soluble 1,2-alkanediol has a solubility in water at 20 C of less than 1.0 g.

7. The method of claim 1, wherein the polyol comprises at least one selected from the group consisting of glycerine, diethylene glycol, triethylene glycol, 1,5-pentanediol, 1,4-butanediol, and a saccharide.

* * * * *